Dec. 13, 1960   L. HUNTER   2,964,278
WHEEL MOUNTING FOR BALANCING APPARATUS
Filed April 29, 1959   2 Sheets-Sheet 1
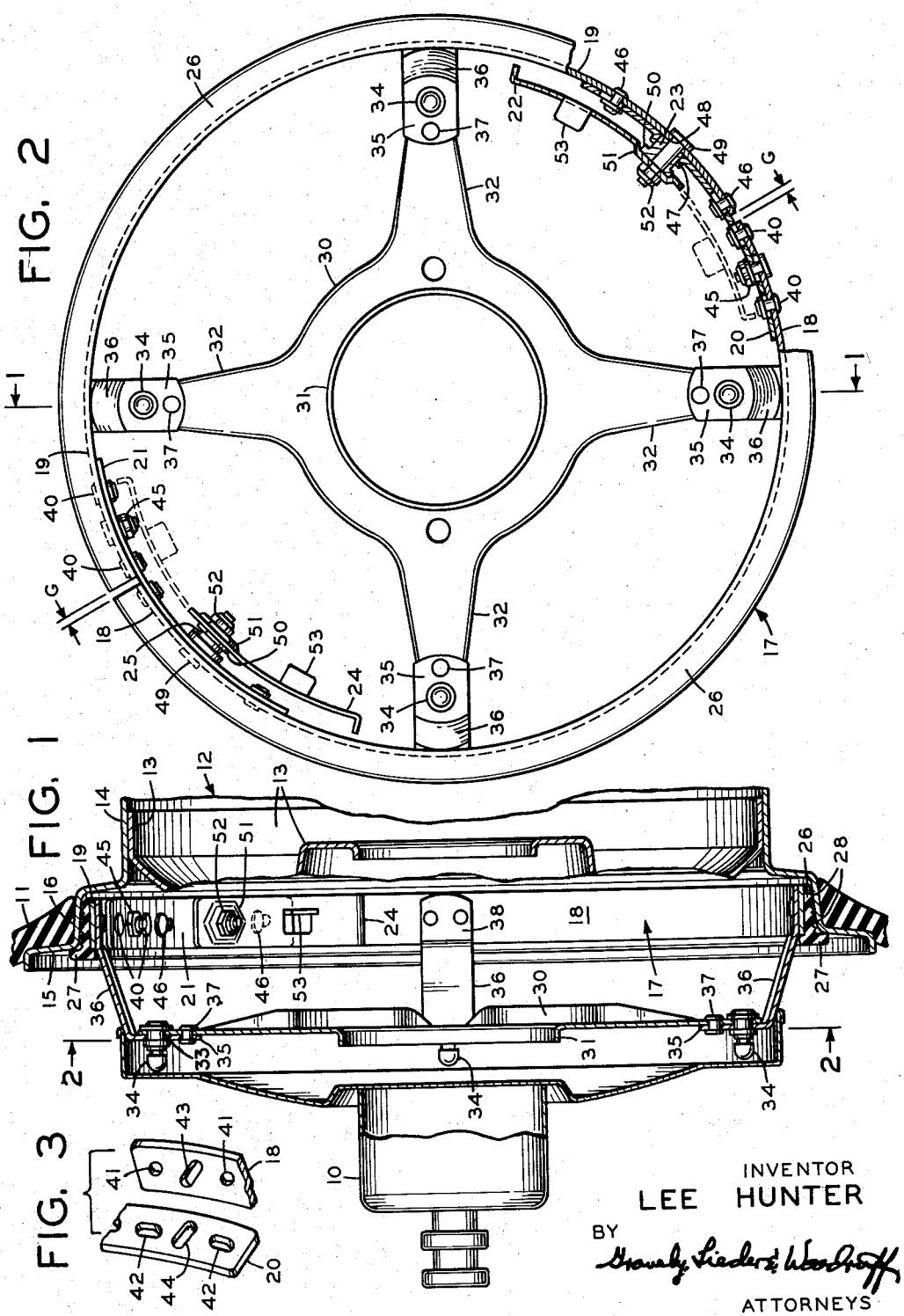
INVENTOR
LEE HUNTER
BY
ATTORNEYS

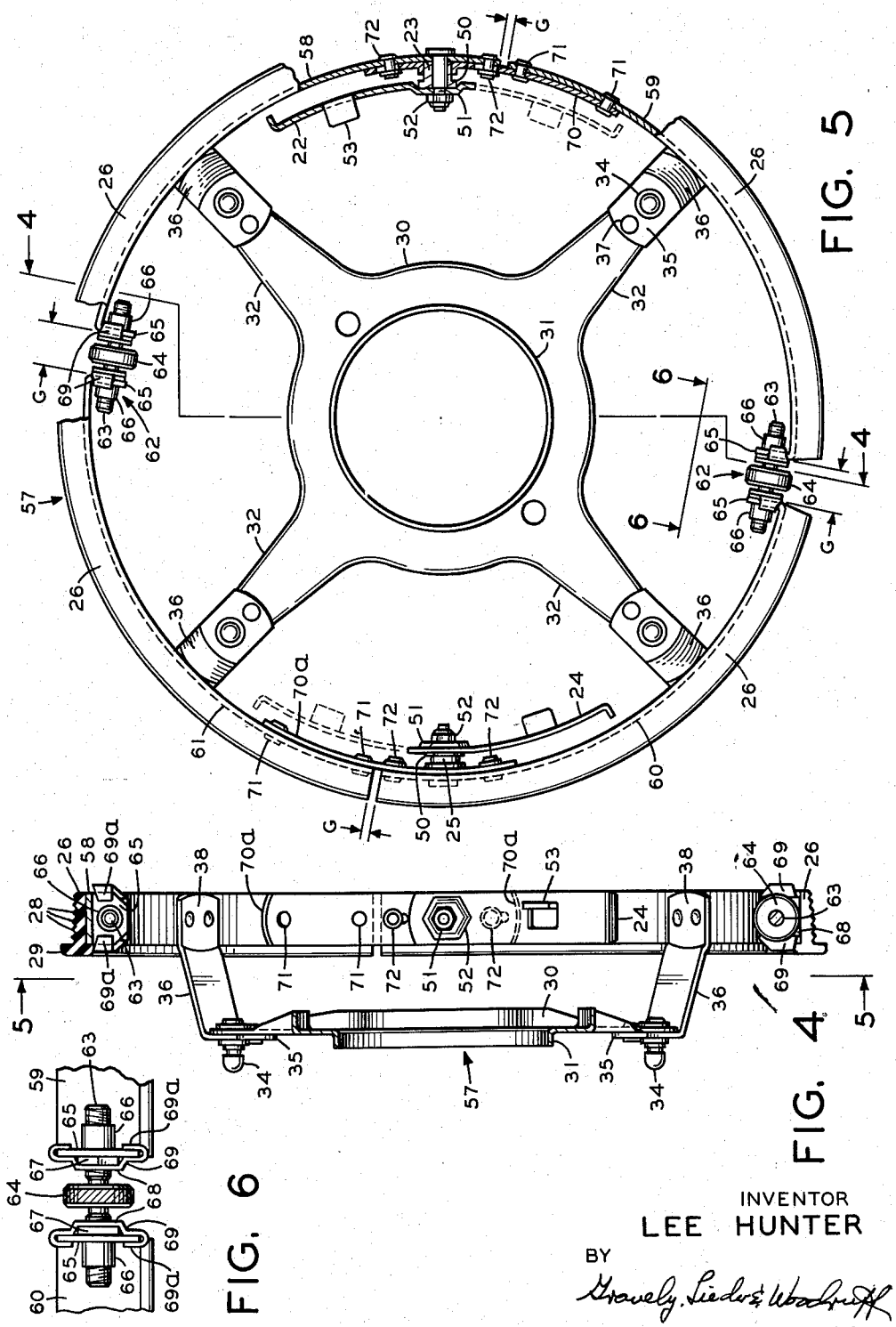

United States Patent Office 2,964,278
Patented Dec. 13, 1960

2,964,278

WHEEL MOUNTING FOR BALANCING APPARATUS

Lee Hunter, Rte. 1, Box 136, Creve Coeur, Mo.

Filed Apr. 29, 1959, Ser. No. 809,796

16 Claims. (Cl. 248—205)

This invention is directed to improvements in mounting means adapted to securely connect rotary balancing apparatus to a vehicle wheel rim, and an important object is to assure the safe and accurate connection of the apparatus so that high speed balancing can be achieved with utmost safety to the operators.

A common problem of long standing has been the failure of mounting devices to obtain a positive and secure grip upon vehicle wheels for retaining the types of rotary balancing apparatus now in use which are designed to be applied directly to the wheel while on the vehicle. It is recognized that a very accurate balancing operation can be obtained with the tire mounted on the wheel rim in place on the vehicle, which accounts for the increasing use of on-the-vehicle balancing apparatus. Such apparatus usually weighs fifteen pounds or more and is rotated with the wheel at speeds closely approximating road speeds to duplicate actual driving conditions. Thus, the weight of the apparatus rotating at road speeds generates a potentially great hazard to the operator and people in the vicinity of the balancing operation, and serious injury can result should the balancing apparatus fly off because of insecure mounting.

Another important object of this invention, therefore, is to provide mounting means and devices which engage the vehicle wheel rim over a large area with enormous frictional gripping power to give positive contact and great assurance that the same will remain in place throughout the balancing operation.

Yet another object of the invention is to provide a very simple, yet mechanically powerful organization to attach and remove mounting means and devices and to construct the same so that the balancing apparatus will have a rigid support of great strength and precise attachment directly on the vehicle wheel.

A further object of the invention is to provide a novel mounting means for attaching balancing apparatus to vehicle wheels of various diameters by circumferentially expanding the means against an internal wheel rim surface to generate enormous frictional and compressive gripping force, and to provide simple and easy to operate means therein for accomplishing the foregoing and other objects hereof.

The objects of the invention are achieved by means and devices hereinafter shown and described, certain preferred forms of the invention being set forth in great detail. For example, the mounting means for an on-the-vehicle balancing apparatus may comprise segmental gripping parts forming a generally circular body, means operatively connecting the body segments for circumferential expansion and contraction, a frictional surface covering on the wheel engaging faces of the body, and balancing apparatus supporting means carried by the body in such manner that the supporting means can retain accurate alignment characteristics substantially without being impaired by the circumferential movement of the body segments. The objects of the invention are also achieved by the elements, parts, components and combinations thereof hereinafter described in connection with the accompanying drawings, wherein:

Fig. 1 is a longitudinal sectional elevational view of mounting means according to the invention, the means being mounted upon a vehicle wheel rim to carry a rotary balancing apparatus adjacent the outer face of the wheel and tire assembly, and the view being taken at line 1—1 in Fig. 2;

Fig. 2 is a front elevational view, partly in section, of the mounting means shown in Fig. 1 with the balancing apparatus removed to show the details of the mounting as seen along line 2—2 in Fig. 1;

Fig. 3 is a fragmentary perspective view of a portion of the assembly of Fig. 2 showing two cooperating parts in relative exploded positions;

Fig. 4 is a longitudinal sectional elevational view of a modified mounting means embodying the principles of the present invention;

Fig. 5 is a front elevational view, partly in section, to disclose the details of the means in Fig. 4 along line 5—5 therein; and Fig. 6 is a fragmentary elevational view at line 6—6 in Fig. 5.

In Fig. 1 the rotary on-the-vehicle balancing apparatus 10 of known characteristics, which forms no part per se of this invention, is disposed adjacent the face of the wheel and tire assembly. The tire 11 is mounted on the wheel 12 having a disc 13 supporting the usual rim 14 formed with the tire bead flange 15 and bead seat flange 16. This is the usual way in which the rims 14 are constructed and the same affords a space between the flange 16 and disc 13 to receive the present mounting means 17 without interference, once the hub cap is removed.

The mounting means 17, shown in Figs. 1 and 2, includes a pair of similar segmental members 18 and 19 having a circular or curved shape to fit within the space defined by the wheel seat flange 16. For purposes presently to appear the members 18 and 19 are shorter than one half a complete circle when placed in the manner shown in Fig. 2, whereby a small gap G is formed at diametrically opposite sides of the assembly. These segmental members 18 and 19 are operatively connected at the adjacent ends by similar segmental bridge members 20 and 21, each of which is curved to closely fit against the inner surfaces of the members 18 and 19 and extends across the gap G at the adjacent ends of the latter. The bridge member 20 at the right hand side in Fig. 2 is secured to the segmental member 18 and is slidably adjustable relative to segmental member 19 through an operating lever 22 and an eccentric element 23. The opposite ends of the members 18 and 19 at the left side in Fig. 2 are similarly operatively connected by the bridge member 21 being secured to member 19 and slidably adjustable relative to member 18 through an operating lever 24 and an eccentric element 25.

Each segmental member 18 and 19 carries on its outer surface similar and coextensive friction bands 26. Each band 26 is formed of resilient synthetic or natural material having a body section bonded to the adjacent outer surfaces of the segmental members, and a flanged section 27 which abuts the outer edge of the adjacent segmental member and extends radially outwardly of the body section to form a wheel rim flange abutment or stop for indicating when the mounting means 17 is fully seated relative to the seat flange 16 of the wheel rim 14. In one construction, the friction bands 26 were formed of neoprene and were provided with a series of serrations or ridges 28 on the outer face, and the body section thereof had a slight taper of approximately four and one-half degrees relative to the cylindrical surface of the segmental members 18 and 19. The taper of the friction bands facilitates placement of the mounting means 17 on the seat flange 16 and serves to evenly distribute the frictional holding power over the width of the seat flange 16, as well as match the usual outward tapered form or configuration of said flange 16.

As shown in Figs. 1 and 2, the mounting means 17 is provided with a spider-like frame 30 having a central disc portion with a circular stiffening flange 31 and a plurality (four being shown) of radially outwardly extending arms 32, the end portions (Fig. 1) of which are apertured at 33 to receive locating button elements 34 which are engaged by latch devices (not shown) carried by the balancing apparatus 10. Each arm 32 of the spider-like frame 30 is secured to the outer end portion 35 of legs 36 by the button elements 34 and by a suitable rivet element 37. The inner end portions 38 of each leg 36 are securely affixed, as by riveting, to the inner surface of the respective segmental members 18 and 19. The arrangement preferred for securing the members 18 and 19 and the respective legs 36 is to locate the radially directed axis of each eccentric element 23 and 25 on the bisector of the included angle between the two most adjacent arms 32, as will be pointed out hereinafter. Furthermore, each of the legs 36 is curved or arcuately shaped transversely of its length to impart strength and stiffness thereto against forces in rotation tending to displace the legs radially. However, the curved configuration of the legs 36 permits a desired degree of lateral displacement in the circumferential direction of the mounting means 17 to take care of the relative circumferential enlargement and contraction of the segmental members 18 and 19 during placement on or removal from the seat flange 16 of the vehicle wheel 12.

The circumferential enlargement and contraction of the mounting means 17 may be seen to advantage in Fig. 2, and the following description of the assembly shown at the right side in Fig. 2 will apply equally well to the assembly at the left side therein. Therefore, similar parts in the respective assemblies will be designated by similar reference numerals. It has been pointed out above that the segmental bridge member 20 operatively connects the adjacent ends of segmental members 18 and 19. More specifically, the member 18 at one side of the gap G remote from the eccentric element 23 is slidably secured to the member 20 by spaced rivet elements 40 seated in apertures 41 in member 18 and in circumferentially elongated slots 42 in bridge member 20 (see Fig. 3). Intermediate the apertures 41, member 18 is provided with an angularly and transversely directed slot 43, and a similarly formed but oppositely angularly directed slot 44 is provided in the bridge member 20. A clamping element 45, such as a threaded bolt and nut, is disposed in the superposed slots 43 and 44 to secure the respective members 18 and 20 in adjusted positions either extended or contracted to change the effective diameter of the circle formed by the segmental members 18 and 19 so as to adapt the mounting means 17 to the diameter of different vehicle wheels 12. It is, of course, understood that the adjustment can be made at the clamping elements 45 at each side of the mounting means 17, or either one may be adjusted without changing the other.

Again referring to the right side of Fig. 2, the end portions of the members 19 and 20 adjacent the eccentric element 23 are slidably secured together by spaced rivets 46 in apertures in member 19 and in slots in the bridge member 29. Between rivets 46 the bridge member is provided with a bore 47, as by extruding an enlarged circular opening therein, and the member 19 is provided with an aperture 48 whose center is off-set to the axis of bore 47. The eccentric element 23 is seated in bore 47 and rotates on a suitable pin 49 seated in the off-center aperture 48, thereby producing the desired eccentric action upon rotation of the element 23, which rotation effects relative circumferential sliding displacement of members 20 and 19. The eccentric 23 is rotated by having its inner multi-sided flanged head 50 seated in a conforming multi-sided recess 51 formed in the end portion of the operating lever 22. The securing element 52 on pin 49 retains the flanged head 50 and recess 51 in operating engagement. The full line position of lever 22 in Fig. 2 corresponds to the circumferentially contracted condition of the segmental members 18 and 19, since the rivets 46 are in the nearest or inner ends of the slots of member 20 when considered in relation to the position of the gap G. At this position, a flag element 53 on the lever 22 is in its outermost visible position as an indicator that the mounting means 17 is not expanded into tight frictional seating engagement on the seat flange 16. When properly secured, the lever 22 is rotated to the position shown in broken lines so that the flag 53 is in an inner and least visible position. The rotation of lever 22, in this manner, causes eccentric element 23 to slide the bridge element 20 relatively outwardly of the end of segmental member 19 to enlarge the gap G. Since the clamping element 45 is secured, the foregoing motion of bridging member 20 is transferred to segmental member 18 to move it away from segmental member 19, thereby expanding the circumferential size of the mounting means 17 in the desired manner.

The foregoing description relating to the assembly of operating parts at the right in Fig. 2 also applies to the corresponding parts at the left. Accordingly, the two levers 22 and 24 are intended to be operated from the full line positions with the flags 53 visible to the broken line positions with the flags 53 withdrawn when the means is properly expanded into the seat flange 16 of the wheel. Once in mounted position, the balancing apparatus 10 may be secured on the respective button elements 34 at the end portions of the spider-like frame 30. The expanding action in the segmental members 18 and 19 is not transferred to the arms 32, but the heretofore mentioned flexing action in the legs 36 absorbs the lateral motion so that the desired spacing of the elements 30 is undisturbed and will exactly match the latching devices in the apparatus 10. A minimal flexing action in the legs 36 is obtained by disposing the eccentric elements 23 and 25 substantially mid-way of the angular spread between the most adjacent pair of arms 32 on the spider-like frame 30. This principle, of course, may be followed for a frame 30 having more or less arms 32 than in the four armed example shown.

The principle of the mounting means 17 above described is carried out in the modified mounting means 57 illustrated in Figs. 4 and 5. It should be understood that similar parts and elements appearing in each embodiment of this invention will be identified by similar reference numerals, and only the modified structure will be described in detail to simplify the following description.

Referring now to Figs. 4 and 5, it can be seen that the spider-like frame 30 is attached by its arms 32 to the supporting legs 36 as heretofore described. It is also pointed out that the friction bands 26 are now divided into four segmental parts, instead of the two parts shown in Fig. 2 so that four gaps G are produced in the circumferential face of the assembly. Beginning at the upper part of the assembly 57 in Fig. 5, and reading clockwise, the friction band segments 26 are carried on segmental members 58, 59, 60 and 61, each being less than one fourth of the complete circle by the gap space G. Each segmental member is secured to the end portion 38 of the adjacent leg 36, and the sectional details shown at the upper right side of Fig. 5 is typical of similar details at other places in the assembly. The principle here is to locate similar parts in diametrally opposite relation so that the whole assembly may be easily balanced as it is part of a rotating mass attached to the vehicle wheel 12 to support the balancing apparatus 10.

It has been pointed out in Figs. 2 and 3 that the clamping element 45 permits the adjustment of the means 17 to fit smaller or larger diameter wheel rims 14. In Figs. 4 and 5, the equivalent means is in the form of a turnbuckle 62 having a right and left hand threaded shaft 63 and an adjusting wheel 64 fixed thereto at the mid-point. The shaft 63 is operatively connected to the respective segmental members 58 and 61 at the flanges 65 bent inwardly in the manner shown to define the gap G previously noted. Each flange 65 has an aperture to receive the barrel 66 of a flat sided, non-rotative nut, the heads 67 of which are disposed adjacent the flanges in the gap G and are held against rotation by a nut securing clip. The clip is formed with an apertured center plate 68 to fit upon the shaft 63, and is bent inwardly at 69 on each side of the heads 67 to fit against the flat sides thereof and prevent rotation of the nuts. Holding fingers 69a are bent around the opposite edges of the flanges 65 to secure the nut and clip in the desired manner. A similar turnbuckle 62 is disposed diametrically opposite and adjacent the gap G between segmental members 59 and 60. It is thought unnecessary to repeat the description of the second turnbuckle 62, since it is constructed in like manner and operates to adjust adjacent members 59 and 60 in the same way. Thus, it will appear that adjusting the turnbuckles 62 will produce a circumferential expansion or contraction in the mounting means 57 to suit the particular wheel diameter encountered for balancing.

Still with reference to Figs. 4 and 5, the operating levers 22 and 24 are similar to those in Figs. 1 and 2, with the following modifications: In Fig. 5, at the right side thereof, the segmental members 58 and 59 are spaced at the adjacent ends to form the gap G, and a segmental bridge member 70 is secured, as by rivets 71, to the member 59 to extend over the gap G and along the inner surface of the adjacent end portion of member 58. Spaced rivets 72 in apertures in member 58 engage in elongated slots in the underlying member 70 on either side of an extruded bore 73 in such member 70. The bore receives the eccentric element 23, and is secured by the holding nut 52. The multi-sided head 50 on the eccentric element 23 is retained by the nut 52 in the multi-sided recess 51 in lever 22 so that it may be rotated by said lever in the manner described in Fig. 2. It is, thus, seen that lever 22 and eccentric 23 operates, as in the manner heretofore described, to slidably shift the bridge member 70 relative to the segmental member 58 and thereby displace segmental member 59 to increase or decrease the gap space G, the full line position of lever 22 being equivalent to a minimum gap G as indicated by the flag 53 being in its most visible position at the face edge of the lever 22. Lever 24, in like manner, adjusts the opposite gap G by sliding the bridge member 70a at the left relative to segmental member 60 to react on the adjacent segmental member 61 riveted at 71 to the end of the member 70a.

The arrangement of the parts and elements shown in Figs. 4 and 5 accomplish the same results of the arrangements shown in Figs. 1, 2 and 3, however, since there are four arcuate segmental members and each one is secured to a different leg 36 of the spider-like frame 30, the lateral flexibility in the legs 36 is less pronounced and more emphasis is found in radial flexing of the legs 36. This difference has less effect on the frame 30 and, therefore, the arms 32 are better able to hold the precise location for buttons 34. Both forms of the mounting means have wheel rim diameter size adjustments and lever actuated eccentrics for exerting a powerful expanding force on the segmental members to press the friction bands 26 into gripping positions against the rim seat flange 16, or on a similar internal surface of a vehicle wheel rim 14. There is thus provided a very efficient mounting means 17 or 57 for rigidly and precisely attaching rotary wheel balancing apparatus directly upon a vehicle wheel and tire assembly. The same mounting means if applied to the tire 15 directly would cause yielding of the tire casing and, therefore, would result in an insecure attachment for the balancing apparatus. The danger to the operator of having the balancing apparatus attached to a yielding body, such as the tire casing, is at once appreciated, whereas the solid nature of the rim 14 offers the maximum degree of safety and mounting security for balancing apparatus which is applied directly to the vehicle wheel at one side of the center plane of wheel rotation. Moreover, the present mounting means is very compact and simple to operate, is composed of symmetrically disposed and easily balanced parts, and permits a desirable location of the balancing apparatus close to the center plane of rotation of the wheel.

It is the intention in describing the present invention to include all equivalent embodiments of parts, members, and components as may come within the scope of the annexed claims.

What is claimed is:

1. In combination with rotary balancing apparatus applied to the face of a vehicle wheel and tire assembly for dynamically balancing the assembly while on the vehicle, mounting means to carry the balancing apparatus during dynamic balancing comprising segmental members connected together to form a circular body, said segmental members having circumferential outer surfaces, means operably engaging said segmental members adjacent said connections to circumferentially expand said outer surfaces onto the vehicle wheel, and a balancing apparatus carrying frame connected to said segmental members, said frame carrying elements in precise spaced relation to receive and retain the rotary balancing apparatus adjacent the face of a vehicle wheel and tire to be balanced.

2. In combination with rotary balancing apparatus applied to the face of a vehicle wheel and tire assembly for dynamically balancing the assembly on the vehicle, mounting means comprising segmental members forming a circular body having gaps between adjacent ends of said members, means bridging said gaps and movably interconnecting said segmental members, eccentric elements engaged in said bridging means and operable to move the bridging means relative to certain of said segmental members to expand and contract said gaps for respectively enlarging and reducing the circumference of said circular body, and a frame connected to said segmental members, said frame supporting spaced means engaged by the rotary balancing apparatus.

3. In combination with rotary balancing apparatus applied to the face of a vehicle wheel and tire assembly for dynamically balancing the assembly on the vehicle, mounting means comprising arcuately formed members together forming a circular body having gaps between adjacent ends of said members, bridging members secured to certain of said arcuate members and extending over said gaps, means slidably connecting said bridging members to others of said arcuate members adjacent said gaps including eccentric elements carried by said bridging members and connected to said other adjacent arcuate members, means operating said eccentric elements to effect sliding displacement of said bridging members and others of said arcuate members to selectively enlarge and reduce said gaps in the circular body to fit upon the vehicle wheel, and a balancing apparatus supporting frame connected to said arcuate members at points spaced from said eccentric members.

4. In combination with rotary balancing apparatus applied to the face of a vehicle wheel and tire assembly for dynamically balancing the assembly while on the vehicle, mounting means for the balancing apparatus comprising elongated arcuately shaped members arranged in end-to-end relation with a gap between the ends thereof, means interconnecting said arcuate members adjacent said gaps to form a circular body conforming to a vehicle wheel and including rotary elements engaged with certain of said members and adapted to move said members relative to others thereof to selectively enlarge and reduce the gaps, friction bands on said members in position to grip the vehicle wheel upon enlargement of the gaps, and a frame carried by said circular body at one side, said frame supporting the rotary balancing apparatus and said members in said circular body supporting said frame on the vehicle wheel.

5. In combination with rotary balancing apparatus mounted at the face of a vehicle wheel and tire assembly for dynamically balancing the assembly on the vehicle, said wheel having a seat flange adjacent the face thereof, mounting means for the balancing apparatus comprising separate arcuate segmental members having outer circumferentially elongated surfaces to engage on said seat flange, selectively operable means connected to said members to move said members relative to each other and in a circumferential direction to expand the circumferential surfaces of said members upon said seat flange and to shrink the circumferential surfaces of said members away from said seat flange, and a balancing apparatus supporting frame connected to said segmental members.

6. The combination with rotary balancing apparatus mounted at the face of a vehicle wheel and tire assembly for dynamically balancing the assembly on the vehicle, said wheel having a seat flange and an adjacent tire bead retaining flange, mounting means for the balancing apparatus comprising a frame supporting the balancing apparatus, a circularly arranged body selectively circumferentially expandable and contractable upon said seat flange, means connecting said frame and body, and friction bands on said body gripping said seat flange with said body expanded, said friction bands having flanges thereon engageable with said tire bead flange to locate said mounting means on the seat flange.

7. The combination with rotary balancing apparatus mounted at the face of a vehicle wheel and tire assembly for dynamically balancing the assembly on the vehicle, said wheel having adjacently positioned tire bead retaining and seat flanges in the face thereof, mounting means for the balancing apparatus comprising a frame supporting the balancing apparatus, arcuately elongated members in end-to-end spaced relation forming a circular body, means connecting said frame to said elongated members, selectively operable means connecting said elongated members and adapted to move said members farther apart and to move said members closer together in a circumferential direction, friction bands on said members and abutment flanges on said bands, said friction bands having outer surfaces presented to said seat flange and a plurality of ridges in said outer surfaces adapted to grip the seat flange upon said members being moved farther apart by said selectively operable means, said abutment flanges engaging said bead retaining flange to locate said friction bands upon said seat flange.

8. A mounting device to connect a balancing apparatus upon a vehicle wheel having a circular seat flange, said device comprising a frame having arms radiating therefrom into different segments of a circle whose center is in said frame, arcuate segmental members carried by said arms and together forming a circular body with its center in said frame and said members lying in the periphery of the first mentioned circle, and means adjustably interconnecting adjacent ends of said segmental members and effective to enlarge or reduce selectively the circumference of the circular body to substantially match the circular seat flange of a vehicle wheel, said adjustable means including eccentric elements rotatably operable to expand said segmental members into the circular seat flange to cause said member to grip the seat flange and secure the balancing apparatus on the seat flange.

9. The mounting device of claim 8, and including friction bands on said segmental members in positions to engage the seat flange, said friction bands being resiliently compressible.

10. The mounting device of claim 8, and including friction bands on said segmental members, said bands having a ridged seat flange gripping surface and an abutment flange adapted to engage a margin of the seat flange and locate said device upon the vehicle wheel.

11. In a mounting device to secure a rotary balancing apparatus upon a vehicle wheel and tire assembly for dynamically balancing the assembly on the vehicle, arcuately elongated members conforming to segments of a circle substantially matching the circle of the vehicle wheel, said members being positioned in end-to-end spaced relation forming a gap therebetween, a bridging member extending along the adjacent spaced ends of said arcuate members, means securing one end portion of said bridging member to an arcuate member, and other means operably interconnecting the opposite end portion of said bridging member to another adjacent arcuate member, said other means including a slide connection and a rotary element in said slide connection to relatively slidably displace said bridge member and said another adjacent arcuate member, the rotary element selectively effecting relative separation and contraction of said arcuate members at the gap therebetween to enlarge the circle of said mounting device to exactly fit into the vehicle wheel circle and exert a gripping force thereon, and to release the gripping force upon the vehicle wheel.

12. In a mounting device to secure a rotary balancing apparatus upon the circular seat flange of a vehicle wheel and tire assembly for dynamically balancing the assembly on the vehicle, arcuately elongated members conforming to segments of the seat flange circle and being arranged in end-to-end spaced relation, a slidably movable member positioned along side the end portions of two adjacent segmental members, one end portion of said movable member having a bore therein and slotted opening at either side, a rotary element in said bore, a pin in a first one of said segmental members adjacent said bore and extending into said bore in off-center relation to said bore, said rotary element having a similar off-center passage receiving said pin, guide elements in said first segmental member at either side of said pin and received in said slotted openings, operating means engaged with said rotary element and mounted on said pin to drive said rotary element in its off center relation as an eccentric and slidably displace said movable member on said first segmental member, the opposite end portion of said movable member being secured to the other of said two adjacent segmental members, the slidable displacement of said movable member increasing the end-to-end spacing of said two adjacent segmental members to increase the circumference of the circle, whereby said segmental members engage and tightly grip the circular seat flange of the vehicle wheel and tire assembly.

13. In a mounting device to grip the circular seat flange of a vehicle wheel and tire assembly and support balancing apparatus on the wheel and tire assembly, a balancing apparatus supporting frame having at least two angularly diverging radially extending arms, leg elements carried at the outer ends of said arms, an arcuately elongated member secured to each of said leg elements and being arranged in end-to-end spaced relation to constitute segments of a circle generally corresponding to the seat flange circular configuration, a bridge member adjacent said segmental members and extending across the space therebetween, an eccentric rotary element carried in one end portion of said bridge member and having an axis of rotation substantially on a line bisecting the included angle between the arms on which said two segmental members are carried, means securing said end portion of said bridge member to the adjacent segmental member for relative sliding adjustment, and other means securing the opposite end portion of said bridging member to the other of said segmental members, rotation of said eccentric element in opposite directions selectively effecting an increase and decrease in the end-to-end spacing between said segmental members, whereby increasing the spacing forces said segmental members tightly upon the circular seat flange and decreasing the spacing releases said segmental members from the circular seat flange.

14. The mounting device set forth in claim 13, wherein said segmental members carry friction bands on the outer surfaces thereof to engage the seat flange of the wheel and tire assembly, said bands having an abutment flange at one margin to abut the margin of the seat flange and locate said device on the seat flange.

15. The mounting device set forth in claim 13, wherein means is connected to said eccentric element to rotate the element in opposite directions, said means having a position indicator thereon to visually indicate the position of increased or decreased spacing between said segmental members.

16. A mounting device to grip the circular seat flange of a vehicle wheel and support balancing apparatus on the wheel, said mounting device comprising: a circular member having a gap space in the circumference thereof; friction band means carried by said circular member at an outer circumferential side to engage the vehicle wheel seat flange, said band means also having a gap space aligned with the first mentioned gap space, whereby said member and band means are free to be expanded circumferentially onto the seat flange and to be contracted circumferentially to release engagement with the seat flange; and means adjacent the first mentioned gap space to effect circumferential adjustment in said circular member including an element extending along said circular member and being secured to said circular member adjacent one side of the gap space therein, and operating means carried between said element and circular member adjacent the opposite side of the gap space therein to effect said circumferential adjustments, said operating means relatively sliding said element and circular member in a circumferential direction.

References Cited in the file of this patent

UNITED STATES PATENTS

| | | |
|---|---|---|
| 2,372,891 | Fenton | Apr. 3, 1945 |
| 2,481,125 | Lannen | Sept. 6, 1949 |